United States Patent

Merchant et al.

[11] Patent Number: 5,378,487
[45] Date of Patent: Jan. 3, 1995

[54] OIL EXTRACTION OF CHOLESTEROL FROM MILK PRODUCTS

[75] Inventors: Zohar M. Merchant, Wilmette; Paul W. Wrezel, Chicago; Lori L. Spurlock, Libertyville; Donald E. Carpenter, Glenview, all of Ill.

[73] Assignee: Kraft General Foods, Inc., Northfield, Ill.

[21] Appl. No.: 32,148

[22] Filed: Mar. 17, 1993

[51] Int. Cl.⁶ ............................................. A23C 9/00
[52] U.S. Cl. .................................... 426/580; 426/585; 426/417; 426/614
[58] Field of Search ............... 426/417, 580, 585, 614

[56] References Cited

U.S. PATENT DOCUMENTS

| | | | |
|---|---|---|---|
| 3,717,474 | 2/1973 | Fioriti et al. | 426/614 |
| 4,103,040 | 7/1978 | Fioriti et al. | 426/614 |
| 4,333,959 | 6/1982 | Bracco et al. | 426/614 |
| 4,997,668 | 3/1991 | Johnson et al. | 426/580 |
| 5,039,541 | 8/1991 | Keen | 426/417 |
| 5,063,070 | 11/1991 | Klemann et al. | 426/271 |
| 5,063,074 | 11/1991 | Kahn et al. | 426/585 |
| 5,091,117 | 2/1992 | Athnasios et al. | 426/417 X |
| 5,091,203 | 2/1992 | Conte, Jr. et al. | 426/614 |
| 5,200,226 | 4/1993 | Sanchez Rodriguez | 426/585 |

FOREIGN PATENT DOCUMENTS

| | | |
|---|---|---|
| 0048818 | 4/1982 | European Pat. Off. |
| 9114377 | 10/1991 | WIPO |
| 9205710 | 4/1992 | WIPO |

OTHER PUBLICATIONS

Bradley, Jr., "Removal of Cholesterol from Milk Fat Using Supercritical Carbon Dioxide", Journal of Dairy Science, vol. 72, No. 10, pp. 2834-2840, Oct., 1989.

*Primary Examiner*—Joseph Golian
*Attorney, Agent, or Firm*—Fitch, Even, Tabin & Flannery

[57] ABSTRACT

A method of extracting cholesterol from a milk product by shearing a mixture of oil:milk product in a ratio of between about 1:99 to about 1:4 and separating the decholesterolized milk product and oil phases.

3 Claims, No Drawings

OIL EXTRACTION OF CHOLESTEROL FROM MILK PRODUCTS

FIELD OF INVENTION

The present invention relates to a process for reducing the cholesterol content of a milk product by extraction with an edible oil.

BACKGROUND OF THE INVENTION

Physicians and health experts generally agree that a diet low in saturated fats and cholesterol can reduce the likelihood of heart and circulatory diseases. Consumer awareness of the health benefits associated with maintaining a diet low in fat and cholesterol has recently increased, along with the demand for food products low in these components. Because of its low fat content, skim milk currently has large applications in such low-fat food products.

Whole milk is a dilute emulsion combined with a colloidal dispersion in which the continuous phase is a solution. Whole milk has a fat content typically between about 3.3% to about 3.4% and 14 mg cholesterol per 100 g milk. To obtain skim milk, whole milk is centrifuged at a low speed. An oil rich phase having cream floating on top, and a liquid phase or skim milk is obtained.

In milk products, the majority of the fat and about 80 percent to about 85 percent of the total cholesterol is present in the cream. The cream is comprised of predominantly milk fat globules. The cholesterol in the milk fat is thought to be distributed between the milk fat globule membrane and the bulk lipid. Wong, *Fundamentals of Dairy Chemistry* (1988). When the membrane is separated from the milk fat globules and the butter oil is isolated from the milk fat globules, about 90 percent or greater of the cholesterol is equilibrated in the butter oil and about 5 percent or greater is in the membrane.

Roughly, the skim milk contains about 10% to about 20% of the cholesterol that is in whole milk. Skim milk contains less than about 0.5% fat, about 10% solids and typically about 2 to about 3 mg of cholesterol per 100 g of skim milk.

The cholesterol in milk products is thought to be associated with triglycerides, milk fat globules and complex proteins. Cholesterol in skim milk is thought to exist in three forms: (i) complexed with residual triglyceride droplets not removed in the skimming process, (ii) complexed with lipoprotein particles sloughed off from milk fat globule membranes in the skimming process, and (iii) complexed with proteins contained in the serum albumin. When skim milk, reduced-fat or whole milk is concentrated, its cholesterol content increases proportionally. For example, nonfat dry milk has a cholesterol content of about 20–30 mg per 100 grams. Therefore, the use of skim milk, reduced-fat or whole milk as an ingredient in low fat foods can contribute significant amounts of cholesterol to these foods.

It is therefore desirable to produce milk products that have a substantially reduced cholesterol content. A satisfactory cholesterol removal process would maximize cholesterol removal without affecting the protein functionality or other properties of the milk. A desirable removal process would be simple to perform and would minimize equipment and raw material requirements. Furthermore, the use of potentially harmful materials such as organic polar solvents would preferably be avoided. No such method is known to have been developed prior to the present invention.

Several approaches have been utilized for removing the cholesterol from milk fats. U.S. Pat. No. 2,613,215 and EP No. 174,848 describe methods of removing cholesterol from fats by contacting with adsorbent materials such as silica gel and activated carbon. When applied to milk products, such adsorbents have been found to either be too impractical for commercial use or to lack specificity for cholesterol adsorption.

The use of supercritical extraction to extract cholesterol-containing triglycerides from butterfat is described in U.S. Pat. No. 4,504,503. Supercritical extraction, however, involves extreme process conditions and is generally too expensive for large commercial applications. Therefore, a more economical process is desired.

U.S. Pat. No. 4,997,668 discloses a process for the reduction of cholesterol in separated milk fat by solvent extraction without significantly altering the character of the milk fat globules. This method requires an organic polar solvent which must be removed by vacuum filtration to avoid residual solvent in the product.

Edible vegetable oils have been used to extract cholesterol from egg yolks, as described in U.S. Pat. Nos. 3,617,474; 4,103,040 and 4,333,959. However, the amount of oil typically required to satisfactorily extract cholesterol from egg yolk is 2 to 5 times the weight of egg yolk. Accordingly, the use of this extraction is economically disadvantageous in that a tremendous amount of oil is required, which thereby results in a large waste stream of spent oil.

The following other references are cited as background information: U.S. Pat. Nos. 4,255,455; 4,882,193; 3,563,765; 4,296,134; 4,971,827; 4,804,555; 4,234,619; 3,881,034 and 3,594,183.

SUMMARY OF THE INVENTION

It is an object of this invention to provide a process for the reduction of the cholesterol content of a milk product.

It is a further object of this invention to provide a process for the reduction of the cholesterol content of a milk product without a significant loss of milk proteins or changes in protein functionality.

It is a further object of this invention to provide a process for the reduction of the cholesterol content of a milk product without the use of polar organic solvents.

In accordance with these and other objects, this invention relates to a process for the production of a low cholesterol milk product by extraction with an edible oil. The milk product is mixed, using a high energy, high shear mixer, with the edible oil so that the oil is dispersed in milk. The resulting dispersion is held for a sufficient time to allow the transfer of the cholesterol from the milk phase to the oil phase. The two phases are separated so that the resulting cholesterol-reduced milk product has substantially the same organoleptic characteristics of an untreated milk product.

This invention is not limited to treatment of skim milk, but can also be practiced on various other milk products. By "milk products" it is meant to encompass milk products of different fat levels. These milk products are meant to include milk that has reduced-fat, whole milk, reconstituted nonfat dry milk, skim milk, such as fluid skim milk, ultrafiltered skim milk, condensed skim milk and various derivatives of skim milk, whey products such as reconstituted fluid whey, whey powder, whey protein isolates and the like. Thus, the extraction process of the present invention provides minimum milk product alteration while achieving maximum removal of cholesterol, i.e., up to 95% removal.

DETAILED DESCRIPTION OF THE INVENTION

To remove the cholesterol from a milk product, the milk product is mixed with an edible oil such as soybean oil and subjected to sufficient shearing energy so that the oil is dispersed in the milk. The dispersion is held with agitation to enhance the transfer of the cholesterol from the milk phase into the oil phase, and the two phases are separated by centrifugation. The resulting product has a reduced cholesterol value, and there are no property limitations which would impair it from being used in any manner in which the milk product is normally used. Thus, the decholesterolized product can be used as a beverage or in ice cream, cheeses, baked goods and the like.

This invention can be practiced using a wide range of oil:milk product ratios, allowing one to run the process at a ratio which results in manageable mixture volumes. As the oil:milk product ratio increases, cholesterol removal is improved. One unexpected result is that significant cholesterol removal can be achieved with the present invention using an oil:milk product ratio as low as about 1:19. A limiting factor in formulating the ratio of ingredients is that when too much oil is added, a stable emulsion is formed. This emulsion is extremely difficult to separate into its component parts. The ratio of ingredients, oil:milk product, is therefore typically between about 1:99 to about 1:4, more preferably a range between about 1:19 to about 1:4. Thus, the present invention is more economical than other methods for removing cholesterol from milk fat, because it is preferably conducted using low oil concentrations.

The oil used for the cholesterol extraction may be any edible oil such as cottonseed oil, lard, palm oil, beef tallow, butterfat, sunflower oil, soybean oil, decholesterolized anhydrous butterfat, medium chained triglycerides, corn oil, canola oil, paraffin, saturated hydrogenated oils and the like. Additionally, a blend of these oils could be used. When skim milk is decholesterolized, corn oil or soybean oil is most preferably used. When whole milk or milk that has reduced-fat is decholesterolized, decholesterolized butterfat is most preferably used. When decholesterolized butterfat is used in the process, the total fatty acid distribution and ratio of saturated to unsaturated fat is substantially the same as the untreated milk product. However, when soybean oil is used, there is a change in the total fatty acid distribution. The resulting product has a saturated to unsaturated ratio of about 1:1.49, whereas when decholesterolized butterfat is used, the fatty acid distribution does not change substantially. The fatty acid distribution of whole milk, of saturated to unsaturated fat, is about 2.15:1.0; whereas the fatty acid distribution of the milk product when treated with decholesterolized butterfat is about 2.12:10. The percent change in fatty acid distribution, as compared to whole milk, when using decholesterolized butterfat, is 1 percent. The percent change in fatty acid distribution when using 10% soybean oil is 320 percent, an increase in unsaturated fatty acid.

Generally, any mixer can be used as a shearing device including, but not limited to, high shear mixers, in-line homogenizers, sonicators and the like. The same mixer could be used both to pre-blend the milk product with oil and to impart the high shear necessary for adequate cholesterol extraction. In order to prevent phase separation prior to the high shear treatment, the milk product and oil are preferably first combined and warmed in a jacketed mixer and then pumped or manually transferred to a high-speed shearing device such as a homogenizer. Typically, the milk product is heated in a jacketed mixer to a temperature of between about 4° C. to about 65° C., preferably between about 40° C. to about 60° C., and then the oil is added. The ingredients are mixed at about 25 to about 1000 RPM for about 1 to about 5 minutes or until a uniform mixture is formed. The mixing and heating can be conducted in various alternative manners, so long as a uniform mixture is formed at the above-described temperatures. For example, either of the ingredients could be preheated in separate equipment prior to its addition to the mixer.

In a preferred embodiment, the preheated uniform mixture is pumped into an in-line pressure homogenizer where the mixture is sheared so that an oil-in-milk dispersion is formed. A limiting factor in choosing shearing conditions is that the amount of cholesterol extracted into the oil increases as the size of the oil droplets in the dispersion decrease; however, if the oil droplets are too small, there is a strong possibility that an oil-in-milk emulsion will form that will be extremely difficult to separate. The desired average oil droplet size diameter after homogenization is between about 2 to about $10\mu$, more preferably between about 4 to about $8\mu$. Typically, this desired oil droplet size will be achieved by homogenization in a mixture containing a ratio of oil:milk product of between about 1:19 to about 1:99. The amount of cholesterol extracted from the milk product into the oil phase increases with the shear temperature, due to the increased solubility of cholesterol in the oil and the reduced viscosity of the oil phase. However, since proteins denature at temperatures of around 65° C. or greater, care must be taken to avoid denaturing the milk proteins. The shearing step is conveniently carried out from between about 4° C. to about 65° C., preferably between from about 40° C. to about 60° C.

We have also discovered that the removal of cholesterol from a milk product is greatly enhanced by holding the dispersion for a time period with gentle agitation prior to separating the two phases. For instance, when a dispersion containing a ratio of oil:milk product of about 1:4 was held for about 20 minutes at a temperature of about 60° C. and with agitation of about 150 RPM, about 52% of the cholesterol was extracted from the separated milk phase. This represents an increase of about 22% in the level of cholesterol extraction achieved without holding the dispersion. The holding step, however, is optional and the processes described herein should not be limited to it. The length of this holding period can be chosen over a wide range to provide an optimal balance between cholesterol removal and plant equipment utilization. The holding time is typically from about 20 minutes to about 2 hours, preferably between about one-half hour to about 1 hour. The holding temperature is maintained between about 4° C. to about 65° C., preferably between about 40° C. to about 60° C. Milder extraction conditions, i.e., lower temperature and lower shear, may require a longer holding time to attain the increase in cholesterol extraction.

One possible theory to explain the effect of increased cholesterol extraction by holding the dispersion is that the holding step enhances cholesterol extraction by providing additional time for the cholesterol to reach its equilibrium concentration in the oil and milk phases. In other words, the net diffusion of cholesterol from the milk phase into the oil phase will continue to occur until the concentration of cholesterol in the oil phase corresponds to the equilibrium concentration at the temperature of the dispersion. Once the equilibrium concentration is reached, no further net transfer of cholesterol into the oil phase occurs. In the shearing step, the desired oil droplet size is thought to be achieved, depending on the shearing process, fairly rapidly, i.e., within a few seconds. However, the time required to reach the equilibrium concentration of cholesterol in the oil appears to be much longer, and therefore cholesterol extraction can be enhanced by providing additional extraction time after the shearing step. In any event, it appears that the holding step is quite beneficial to the extraction of cholesterol.

The cholesterol-rich oil phase is conveniently separated from the dispersion by centrifugation. Any means may be used to separate the oil-rich phase from the milk product phase, i.e., membrane microfiltration, but typically centrifugation is used. The nature of the oil may require removal of the oil-rich phase as a semi-solid or as a liquid. Removal of the oil-rich phase as a liquid is preferred for continuous liquid-liquid centrifugation processes. Phase separation occurs more readily at warmer temperatures because the viscosity of the oil is lower; however, exposure to excessive temperature can result in protein denaturation. The preferred temperature range for the centrifugation is between about 4° C. to about 60° C., most preferably between about 10° C. to about 43° C. Separation also depends on the size of the oil droplets, with greater centrifugal force being required as the droplet size decreases. At centrifugal forces above about 15,000 gravities, sedimentation of milk protein may occur. The separation is therefore preferably conducted with a centrifugal force of between about 2,000 to about 10,000 gravities. In addition, pump speed and the temperature of the mixture can affect separation during continuous centrifugation.

We have also discovered that cholesterol extraction from the milk product with oil is greatly enhanced by the presence of a small quantity of vitamin D in the oil:milk product mixture at lower temperatures. For example, a mixture containing a ratio of oil:milk product:vitamin D of about 1:4:0.0025 was warmed to about 60° C. and then homogenized using a bench-top model shear blender at full speed. The homogenized mixture was incubated for about 60 minutes at about 32° C. with agitation at 150 rpm. After centrifugation, about 82% of the cholesterol had been extracted into the oil. This represents about a 21% increase in the level of cholesterol extraction achieved without vitamin D addition.

Although the invention should not be limited by the theory, it is believed that vitamin D increases cholesterol extraction into the oil phase by forming a stable complex with cholesterol in the oil phase. Vitamin D enhances cholesterol removal when the homogenized mixture is held at a temperature of 32° C. When the holding temperature is raised to 60° C., the effect of vitamin D on cholesterol removal is negligible. Therefore, it is preferred that if the vitamin D is added to the oil-in-milk dispersion, in order to obtain the increased benefit of the addition of Vitamin D, the temperature of the milk product should be kept below 60° C. The vitamin D is conveniently added directly to the oil extractant prior to combination of the oil and the milk product. Alternatively, the vitamin D could be added directly to the milk product or to the combined oil:milk product mixture. Typically the ratio of oil:milk product:vitamin D is between about 1:99:0.001 to about 1:4:0.01, preferably between about 1:9:0.001 to about 1:4:0.005. The Vitamin D can be purchased from Hoffman-LaRoche.

The present invention can be successfully applied to a milk product having a higher solids and cholesterol content, such as reconstituted nonfat dry milk, condensed skim milk, ultrafiltered skim milk, reconstituted whey powder, whole milk and the like. However, if the milk product and oil mixture is too viscous, then separation of the oil and milk product is extremely difficult. In a mixture containing a ratio of oil:milk product of between about 1:99 to about 1:4, the untreated skim milk product could have a solids content of up to about 50%, more preferably up to about 20%. Another aspect of the process is that as the solids level of the untreated milk product increased, the amount of cholesterol extracted per weight of oil also increased.

Many variations of the method described above could be used depending upon the desired needs of the user. For example, further cholesterol removal from the treated milk product could be achieved by repeating the steps of the process disclosed herein a multitude of times with fresh batches of oil. Alternatively, the separated milk product could be recentrifuged to remove any residual oil contained therein. After separating the oil from the milk product, the cholesterol contained in the oil could be removed by any convenient method, such as by stream stripping or by molecular distillation; the regenerated oil could then be recycled to the process.

Further processing of the reduced-cholesterol milk product, such as pasteurization, concentration and the like, could be conducted downstream of the centrifugation to tailor to specific product applications.

The following Examples are for the purpose of further illustrating embodiments of the invention, but are not intended to limit or narrow the scope of the invention herein.

EXAMPLE 1

80 grams of skim milk and 20 grams of soybean oil were combined in a container, warmed to 60° C., and homogenized with a Tek-Mar Tissumizer for 90 seconds at full speed. The homogenate was chilled rapidly to 10° C. and centrifuged at 1000 g for 15 minutes. The amount of cholesterol extracted into the oil rich phase was 30% of that originally present in the skim milk.

EXAMPLE 2

The experiment of Example 1 was repeated except that the homogenate was agitated at 150 RPM at 60° C. for 20 minutes prior to centrifugation. The amount of cholesterol extracted into the oil rich phase was 52% of that originally present in the skim milk. The amount of cholesterol extracted was 22% higher than the amount extracted without the holding step.

EXAMPLE 3

0.05 grams of vitamin D was added to 20 grams of soybean oil. The vitamin D-rich soybean oil was combined with 80 grams of skim milk in a mayonnaise jar, warmed to 60° C., and homogenized with Tek-Mar Tissumizer for two minutes at full speed of the instrument. The homogenate was agitated at 150 RPM and 32° C. for 60 minutes. The amount of cholesterol extracted into the oil was 82% of that originally present in the skim milk. The amount of cholesterol extracted was 21% greater than the amount extracted by the same method except without the addition of vitamin D.

EXAMPLE 4

Part A—95 grams of skim milk and 5 grams of soybean oil were combined in a container, warmed to 60° C. and homogenized with a TEK-MAR Tissumizer for 10 seconds at full speed. The homogenate was held at 60° C. for 1 hour and centrifuged at 2800 g for 15 minutes at 10°-15° C. The amount of cholesterol removed from the skim milk was 60% of that originally present (see Table 1, Trial 1).

Part B—The protocol of Part A was repeated except that 90 grams of skim milk and 10 grams of soybean oil was used. The amount of cholesterol removed was 79% of that originally present (See Table 1, Trial 2).

Part C—The protocol of Part A was repeated except that 80 grams of skim milk and 20 grams of soybean oil was used. The amount of cholesterol removed was 80% of that originally present (See Table 1, Trial 3).

TABLE 1

|  | % Cholesterol Removed | % Fat | % Protein | % Solids |
| --- | --- | --- | --- | --- |
| Control SM | N/A | 0.2 | 3.25 | 9.4 |
| Trial 1 5% SB/SM | 60 | 1.5 | 3.20 | 10.5 |
| Trial 2 10% SB/SM | 79 | 1.6 | 3.30 | 10.7 |
| Trial 3 20% SB/SM | 80 | 3.0 | 3.0 | 11.2 |

SM = skim milk
SB = soybean oil
As can be seen from the data above, a substantial amount of cholesterol is removed from the milk product without significantly reducing the amount of protein.

EXAMPLE 5

171 lbs. of regular skim milk was warmed to 60° C. and combined with 9 lbs. of soybean oil in a Breddo mixer. The mixture was allowed to blend for 2 minutes at full speed and was then pumped with a Waukesha 25 pump through a Hydroshear HS-2. In the Hydroshear, the mixture was homogenized by means of impact shear. The homogenate was held for 30 minutes in metal containers and for an additional 30 minutes in a Groen tank mixer. In the Groen tank mixer, the homogenate was agitated at 36 RPM. The temperature during the entire holding period was maintained between 49° C. and 60° C. The homogenate was then rapidly cooled to 43° C. and pumped with a Bran-Lube pump to an Alpha-Laval continuous centrifuge using a 57.5 gravity disk and a pump speed that gives flow rates of 11.2 and 2.3 lbs. per minute for the heavy and light phases, respectively. It was found that adjustment of the pump speed gave the desired partitions of oil in the "light" (cream) and "heavy" (skim milk) phases. The amount of cholesterol in the skim milk phase was reduced to 0.0020%, which was a decrease of 37.5% from the initial amount. The skim milk phase was then recentrifuged using a pump speed giving flow rates of 11.7 and 2.0 lbs. per minute for the heavy and light phases, respectively. The amount of cholesterol in the recentrifuged skim milk phase was reduced to 0.0018%, which was a decrease of 43.8% from the initial amount. Residual fat content was lower than in the original skim milk. Minimum protein loss was detected.

EXAMPLE 6

162 lbs. of condensed skim milk containing 34% solids was combined with 18 lbs. of soybean oil in a Breddo mixer. The combined ingredients were agitated at full speed until the temperature reached 60° C. The mixture was then pumped with a Waukesha 25 pump through a Hydroshear HS-2. The homogenate was mildly agitated at 30 RPM in a Groen tank mixer for 30 minutes at 60° C., cooled to 43° C., and centrifuged in an Alpha-Laval continuous centrifuge using a 57.5 gravity disk and pump speed giving flow rates of 18.4 and 7.6 lbs./minute for the heavy and light phases, respectively. The skim milk phase contained 0.0043% cholesterol, which was a decrease of 48.8% from the initial amount. The skim milk phase was then recentrifuged using a pump speed giving flow rates of 17.9 and 1.5 lbs. per minute for the heavy and light phases, respectively. The amount of cholesterol in the recentrifuged skim milk phase was 0.0040%, which was a decrease of 52.4% from the initial amount.

EXAMPLE 7

130 lbs. of ultrafiltered skim milk containing 25% solids was combined with 14.4 lbs. of soybean oil in a Breddo mixer. The combined ingredients were agitated at full speed until the temperature reached 60° C. The mixture was pumped with a Waukesha 25 pump through a Hydroshear HS-2. The homogenate was agitated at 30 RPM in a Groen tank mixer for 45 minutes at 60° C., cooled to 43° C., and centrifuged in an Alpha-Laval continuous centrifuge using a 57.5 gravity disk and pump speed giving flow rates of 18.3 and 5.7 lbs. per minute for the heavy and light phases, respectively. The skim milk phase contained 0.0069% cholesterol, which was a decrease of 57.9% from the initial amount. The skim milk phase was then recentrifuged at a pump speed giving flow rates of 22.4 and 0.8 lbs./minute for the heavy and light phases, respectively. The amount of cholesterol in the recentrifuged skim milk phase was reduced to 0.0056%, which was a decrease of 65.9% from the initial amount.

EXAMPLE 8

Part A—80 grams of reconstituted Krafen whey powder containing 10% solids was combined with 20 grams of soybean oil in a mayonnaise jar and warmed to 60° C. The mixture was homogenized with a Tek-Mar Tissumizer for 60 seconds at full speed. The homogenate was held at 60° C. for 1 hour. In order to separate the skim milk and cholesterol-rich cream phases, the homogenate was transferred to centrifuge tubes, and centrifuged at 2800 gravities and 10° C. for 15 minutes. Analysis of the high density phase (lower layer) indicated that 88% of the cholesterol had been removed from the whey (see Table 2).

Part B—The experiment in Part A was repeated except 80 grams of 20% Krafen whey powder was used. The amount of cholesterol removed was 95% from that originally present in the 20% whey powder (see Table 2).

TABLE 2

|  | % Cholesterol Removed | % Fat | % Solids |
| --- | --- | --- | --- |
| Control 10% WP | N/A | 0.16 | 9.66 |
| Control 20% WP | N/A | 0.25 | 19.55 |
| 20 SB/10% WP | 88 | 1.50 | 10.80 |

TABLE 2-continued

|  | % Cholesterol Removed | % Fat | % Solids |
|---|---|---|---|
| 20 SB/20% WP | 95 | 0.70 | 19.10 |

WP = whey powder
SB = soybean oil
As can be seen from the data above, a substantial amount of cholesterol is removed from the milk product without significantly reducing the amount of solids.

EXAMPLE 9

Part A—80 grams of 10% nonfat dry milk and 20 grams of soybean oil were combined in a mayonnaise jar, warmed to 60° C. and homogenized with Tek-Mar Tissumizer for 90 seconds at full speed. The homogenate was held at 60° C. for 1 hour and centrifuged at 2800 g for 15 minutes at 10° C. The amount of cholesterol extracted into the oil phase was between 84% of that originally present in the nonfat dry milk (see Table 3).

Part B—The experiment in Part A was repeated except that 80 grams of 20% nonfat dry milk was used. The amount of cholesterol extracted into the oil phase was 69% of that originally present in the 20% nonfat dry milk (see Table 3).

TABLE 3

|  | % Cholesterol Removed | % Fat | % Proteins | % Solids |
|---|---|---|---|---|
| Control 10% NFDM | N/A | N/A | 3.3 | 9.5 |
| Control 20% NFDM | N/A | 0.8 | 6.6 | 18.9 |
| 20 SB/10% NFDM | 84 | 2.6 | 2.9 | 11.0 |
| 20 SB/20% NFDM | 69 | 6.6 | 6.1 | 24.2 |

NFDM = nonfat dry milk
SB = soybean oil
As can be seen from the data above, a substantial amount of cholesterol is removed from the milk product without significantly reducing the amount of protein.

EXAMPLE 10

Part A—90 grams whole milk and 10 grams soybean oil or decholesterolized butterfat (75-80% cholesterol reduced) maintained at 60° C. was homogenized, followed by holding and centrifugation. The amount of cholesterol collected into the oil phase was 74% for 10% soybean oil and 66% with 10% decholesterolized butterfat. The composition of the milk fat in whole milk remained essentially the same with decholesterolized butterfat treatment.

Part B—80 grams whole milk and 20 grams soybean oil or decholesterolized butterfat were used to repeat the protocol of Part A. The amount of cholesterol collected into the oil phase was 85% for 20% soybean oil and 66% with the 20% decholesterolized butterfat (see Table 4).

TABLE 4

|  | % Cholesterol Removed | % Fat | % Proteins | % Solids |
|---|---|---|---|---|
| Control WM | N/A | 3.4 | 3.2 | 12.2 |
| 10% SB/WM | 74 | 2.5 | 3.1 | 11.2 |
| 20% SB/WM | 85 | 3.0 | 2.8 | 11.4 |
| 10% DBF/WM | 66 | 2.4 | 3.0 | 11.3 |
| 20% DBF/WM | 66 | 3.0 | 3.0 | 11.6 |

WM = whole milk
SB = soybean oil
DBF = decholesterolized butterfat
As can be seen from the data above, a substantial amount of cholesterol is removed from the milk product without significantly reducing the amount of protein.

EXAMPLE 11

Frozen dessert samples were prepared from a reduced cholesterol milk product, i.e., skim milk or condensed skim milk prepared as described in Examples 5 and 6. The frozen desserts were made using a standard protocol whereby the ingredients (sugar, stabilizer, starch, corn syrup and flavor) were mixed with the reduced cholesterol milk product followed by pasteurization and homogenization. The mix was then held overnight in a cooler. The next step was freezing followed by hardening and storage. The frozen desserts had a reduction in cholesterol from 40% to 50% as compared to a control prepared from an untreated milk product. The flavor and texture of the test and control samples were comparable.

What is claimed is:

1. A method of extracting cholesterol from a milk product where the method comprises: forming a mixture comprising milk, oil and vitamin D, the mixture containing a ratio of oil to milk product of between about 1:99 to about 1:4, wherein the mixture contains the vitamin D such that the ratio of oil:vitamin D is between about 0.05% to about 1.0%, shearing the mixture, and separating the oil and milk phases by centrifugation.

2. The method of claim 1, wherein the mixture contains an amount of vitamin D such that the ratio of oil:milk product:vitamin D is between about 1:99:0.001 to about 1:4:0.01.

3. The method of claim 2, wherein the mixture contains an amount of vitamin D such that the ratio of oil:milk product:vitamin D is between about 1:9:0.001 to about 1:4:0.005.

* * * * *